United States Patent [19]

Balzano et al.

[11] Patent Number: 5,092,609
[45] Date of Patent: Mar. 3, 1992

[54] HIGH-PRESSURE SEALING DEVICE BETWEEN TWO ELEMENTS IN RELATIVE MOTION

[75] Inventors: Lucien D. Balzano, Jouars-Pontchartrain; Marc V. A. Lepretre, Bois-Colombes; Claude Portier, Le Chesnay, all of France

[73] Assignee: Berlen & Cie, Cedex, France

[21] Appl. No.: 245,676

[22] Filed: Sep. 16, 1988

Related U.S. Application Data

[63] Continuation-in-part of Ser. No. 9,361, Dec. 22, 1986, abandoned.

[30] Foreign Application Priority Data

Apr. 22, 1985 [FR] France .................. 85.06035

[51] Int. Cl.$^5$ .................. F16J 15/40; F16J 15/46; F16J 15/56
[52] U.S. Cl. .................. 277/27; 277/59; 277/73; 277/135; 277/173; 277/176; 277/190; 277/198
[58] Field of Search .......... 277/27, 58, 59, 117–122, 277/190, 198, 135, 73, 173, 174, 176; 92/165 R, 169.1, 86, 86.5

[56] References Cited

U.S. PATENT DOCUMENTS

| | | | |
|---|---|---|---|
| 843,230 | 2/1907 | McCarthy | 277/120 X |
| 2,791,194 | 5/1957 | Janise | 277/120 X |
| 3,004,783 | 10/1961 | Webb | 277/112 X |
| 3,186,724 | 6/1965 | Wheatley | 277/59 |
| 3,434,728 | 3/1969 | Soldato | 277/103 X |
| 3,827,700 | 8/1974 | Kaller | 277/59 |
| 3,833,227 | 9/1974 | Nilsson | 277/190 X |
| 3,834,715 | 9/1974 | Butler | 277/59 X |
| 3,865,387 | 2/1975 | Larker et al. | 277/117 |
| 3,877,707 | 4/1975 | Syvakari | 277/190 |
| 4,106,779 | 8/1978 | Zobeik | 277/27 |
| 4,364,542 | 12/1982 | Meyer | 277/59 X |
| 4,411,434 | 10/1983 | Lewis | 277/59 X |

FOREIGN PATENT DOCUMENTS

| | | | |
|---|---|---|---|
| 2110263 | 6/1972 | France . | |
| 2155531 | 5/1973 | France . | |
| 2225043 | 10/1974 | France . | |
| 341771 | 1/1931 | United Kingdom . | |
| 554094 | 6/1943 | United Kingdom | 277/117 |
| 981980 | 2/1965 | United Kingdom | 277/72 FM |

Primary Examiner—Allan W. Shoap

[57] ABSTRACT

A sealing device wherein at least one of the sealing assemblies comprises at least two concentrically arranged rigid wedge rings having confronted conical surfaces, the inner and outer rings having respective inner and outer cylindrical surfaces slidingly confronting the plunger and the cylinder recessed portion, respectively, whereby axial compression of the wedge rings of each sealing assembly causes relative axial displacement and thus radial expansion thereof and forced mating of all confronting surfaces of said rings, plunger and cylinder, wherein the low-pressure end of one of the wedge rings of the first sealing assembly operatively abuts against the corresponding step of the cylinder recess while the second sealing assembly is slidably mounted in the recess and the high-pressure end thereof is exposed to the compressed liquid; and wherein an intermediate chamber defined in the recess between the sealing assemblies is filled with a sealing liquid to which the high pressure of the compressed liquid is transmitted through overall axial sliding of the second sealing assembly, thereby causing radial expansion of both sealaing assemblies and filling by the sealing liquid of the gaps between the confronted surfaces, the sealing liquid having a viscosity so adapted as to substantially plug the gaps and stop the compressed liquid.

10 Claims, 2 Drawing Sheets

HIGH-PRESSURE SEALING DEVICE BETWEEN TWO ELEMENTS IN RELATIVE MOTION

This application is a continuation-in-part of application Ser. No. 07/009,361 filed Dec. 22, 1986, now abandoned.

FIELD OF INVENTION

The invention relates to a high-pressure sealing device between two elements in relative movement More particularly, the invention relates to a high-pressure sealing device for a pump or a pressure intensifier comprising a plunger moving in a longitudinal alternating movement in a chamber in order to compress under high pressure a fluid introduced into the latter.

BACKGROUND OF INVENTION

A sealing device for a pump or a pressure intensifier is known, for example, from French Patent No. 2,182,519. The sealing device disclosed in the '519 patent is arranged between the surface of a plunger and the sleeve of a chamber formed in a cylindrical body of a pump. The device, seated in the sleeve, comprises a segment communicating with the external sealing-fluid supply circuit. A ring bears on the radial walls of the segment, and the second side face of this ring has a convex form. This face interacts with chevron sealing rings. The last ring comes in contact with an outer ring, the adjacent face of which matches the chevron ring and the other face of which comes up against a bearing ring in contact with the radial wall of the guide bush of the plunger. The assembly consisting of the rings and of the segment is clamped together by means of a nut screwed into the cylindrical body. The sealing fluid is introduced via the segment at a pressure corresponding to that prevailing in the pump chamber during the compression cycles and passes between the sealing rings and the surfaces of the piston and of the sleeve towards the end at a lower pressure. The leakage fluid is removed in an annular space at atmospheric pressure.

The leakage of the sealing fluid is determined by the clamping of the rings which has to be readjusted frequently as a result of wear.

French Patent No. 2,155,531 also discloses a sealing device for a pneumatic spring, comprising, between the inner surface of the cylinder and the piston, two sealing rings which are separated by a space filled with a sealing fluid. The two rings have outer and inner lips on their side faces opposite one another. On the atmosphere side, the first ring bears against a fixed end piece. On the high-pressure side, the second ring bears against a radial face of a movable end ring, the other face of which is subjected to the high pressure of the gas contained in the cylinder. As a result of the differences in cross-section of the end ring and of the sealing rings, a pressure greater than that of the gas is exerted on the sealing fluid which lays the lips of the rings against the walls of the cylinder and of the piston.

The main function of this sealing device is to prevent leakages of the compressed gas which permanently inflates the pneumatic spring.

French Patent No. 2,225,043 discloses a reciprocating pump for high pressures, which has a sealing device consisting of a floating piston capable of moving sealingly in an annular chamber. One face of the piston is subjected to the high-pressure fluid which escapes between the walls of the sleeve and of the pump piston during the compression stroke, and the floating piston is then pushed back and, by means of its other face, compresses the sealing fluid which, during the intake stroke, is introduced into a chamber located on the low-pressure side. The sealing fluid, forced between the sleeve and the piston towards the low-pressure side, is recovered and returned to the supply circuit.

The sealing obtained in this way is satisfactory, but at the expense of a substantial fluid leakage. Moreover, the devices ensuring sealing between the high-pressure liquid and the fluid are subject to considerable wear and require frequent changes if a reduction in efficiency is to be avoided.

GENERAL DESCRIPTION OF INVENTION

The present invention relates to a device similar to those mentioned above, but is intended to provide a sealing device having only a very slight leakage of sealing fluid and comprising play-compensating sealing rings of increased efficiency and longer service life.

The device according to the invention is notably in that at least one of the sealing assemblies comprises at least two concentrically arranged rigid wedge rings having confronted conical surfaces, the inner and outer rings having respective inner and outer cylindrical surfaces slidingly confronting the plunger and the cylinder recessed portion, respectively, whereby axial compression of the wedge rings of each sealing assembly causes relative axial displacement and thus radial expansion thereof and forced mating of all confronting surfaces of said rings, plunger and cylinder, wherein the low-pressure end of one of the wedge rings of said first sealing assembly operatively abuts against the corresponding step of said cylinder recess while said second sealing assembly is slidably mounted in said recess and the high-pressure end thereof is exposed to the compressed liquid; and wherein an intermediate chamber defined in said recess between said sealing assemblies is filled with a sealing liquid to which the high pressure of said compressed liquid is transmitted through overall axial sliding of said second sealing assembly, thereby causing radial expansion of both sealing assemblies and filling by said sealing liquid of the gaps between said confronted surfaces, said sealing liquid having a viscosity so adapted as to substantially plug said gaps and stop the compressed liquid.

THE DRAWING AND DETAILED DESCRIPTION OF INVENTION

The explanations and figures given below by way of examples will make it possible to understand how the invention can be put into practice.

FIG. 1 shows, in diagrammatic section, a high-pressure pump or a pressure intensifier containing a sealing device according to an exemplary embodiment of the invention.

Figure 1:
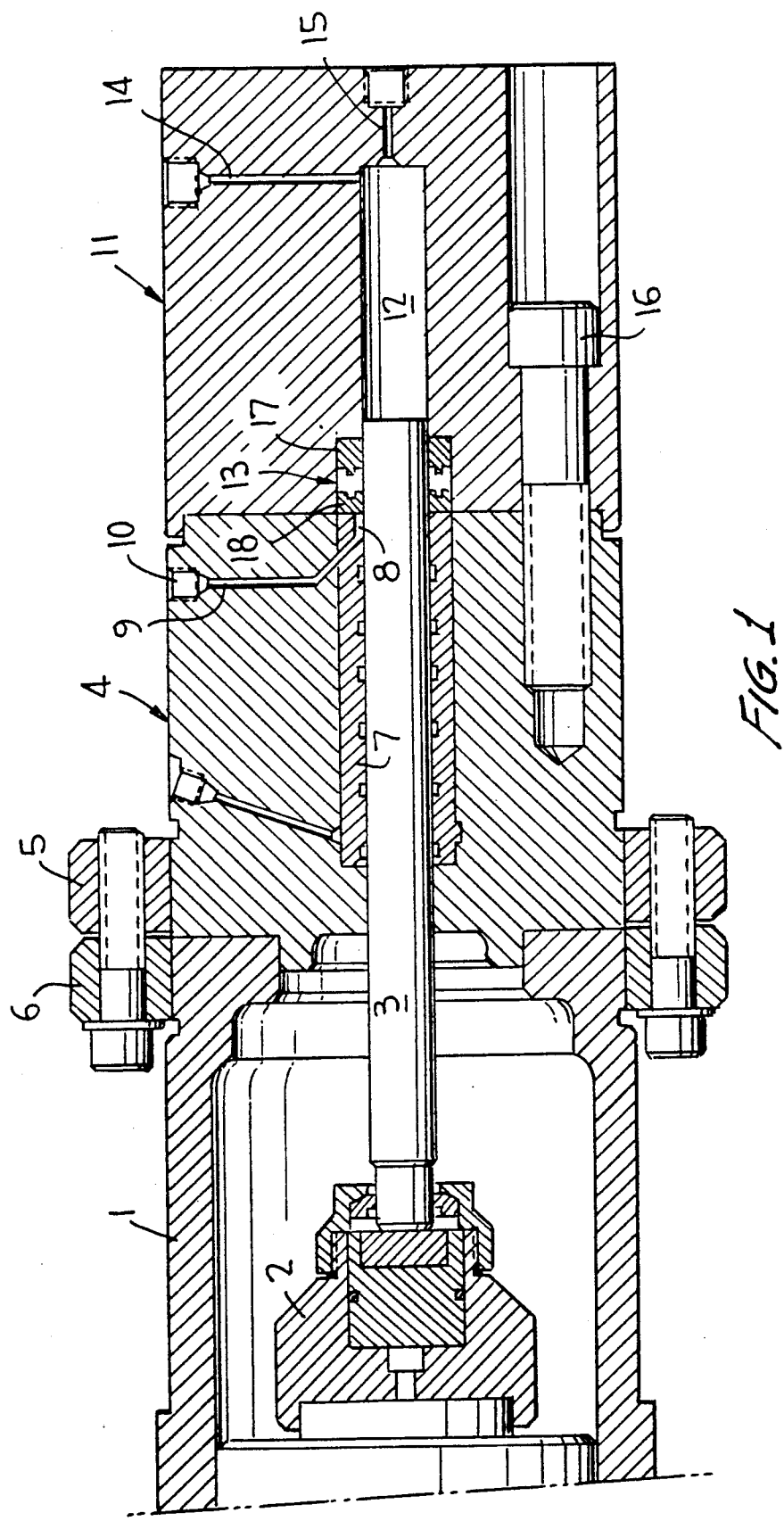
FIG. 1 shows a diagrammatic section through a high-pressure pump which contains a first exemplary embodiment of a sealing device according to the invention.

In the rest of the description, the general term "pump" will denote high-pressure pumps, pressure intensifiers and other devices capable of generating high pressures by means of the travel of a piston or plunger.

The pump comprises a cylindrical assembly comprising a cylindrical casing 1 mounted at one of its ends on a drive device, the output member 2 of which transmits a to-and-fro movement to the plunger 3. A body 4 is fastened to casing 1 by means of a connecting strap 6 to a corresponding connecting strap 5 located at the end of casing 1 opposite output member 2. A bore passes axially through body 4 and is stepped to accommodate a sleeve 7 of small relative thickness in which the plunger 3 moves. A chamber 8 for a sealing liquid is provided in the thickness of the sleeve, communicating via a duct 9 with a supply chamber 10 provided in the outer surface of body 4. A cover 11 is fastened to the end of body 4 and has in its axis a stepped bore 12 forming a pressure chamber.

The body 4 and the cover 11 constitute a classic cylinder and includes a sealing chamber 13 opening directly into the axial bore provided in the cover 11 in the extension of the sleeve 7. The bottom of the pressure chamber 12 communicates with a relief channel 14 and a pressure fluid intake duct 15. The cover 11 is fastened to the body in a known way by means of bolts 16. The sealing device according to the invention includes the sealing chamber 13 and two sealing assemblies 17, 18 arranged on either end of the sealing chamber.

Figure 2:
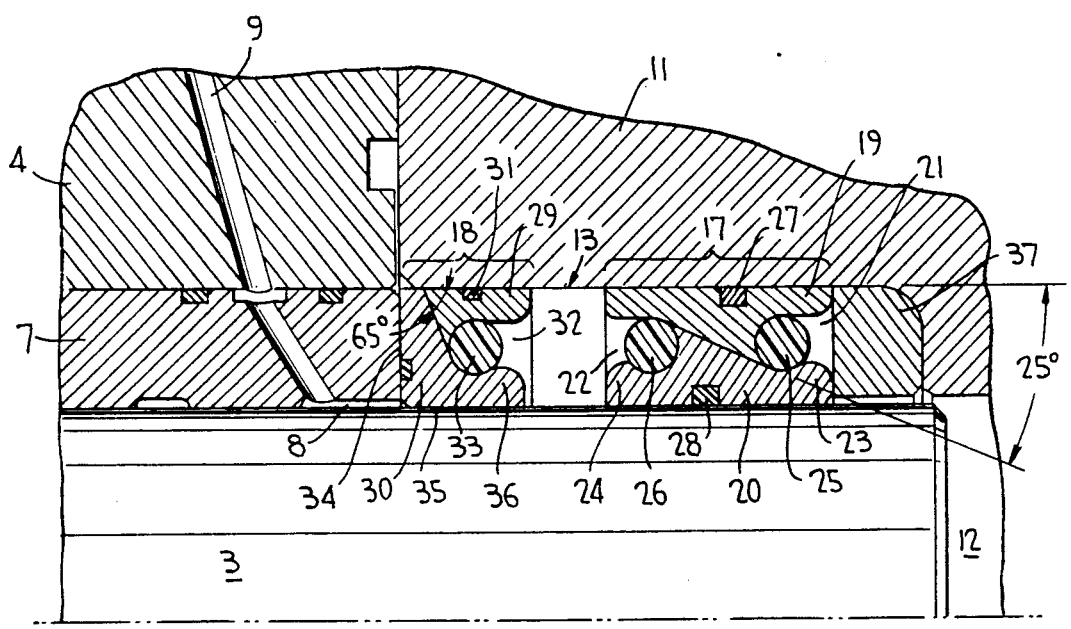
FIG. 2 is a sectional view on a larger scale of the sealing device of FIG. 1.

According to the embodiment illustrated in FIG. 2, which is a sectional view on a larger scale of the sealing device of FIG. 1, the sealing assemblies 17, 18 are in direct contact with the plunger 3. The sealing assembly 17 located on the high-pressure side includes two rigid wedge rings, normally an outer ring 19, of which the cylindrical outer surface interacts sealingly with the outer wall of the chamber 13, and an inner ring 20, of which the cylindrical inner surface interacts sealingly with the inner wall of the chamber 13 formed, in this example, by the outer surface of the plunger 3.

The terms "outer" and "inner" are used to denote relative positions in relation to the axis of the pressure chamber. The term "outer" refers to the position furthest away from the axis; and the term "inner" refers to the position nearest to the axis.

The two wedge rings 19, 20, which are concentric, are at least partially interlocked along two conical surfaces facing one another. The two rings are of approximately triangular cross-section and have, on their radial face, a semi-toroidal receptacle 21, 22 tangent to the conical surface of the other ring, while the end of the conical surface of the ring carrying the receptacle has a bead 23, 24 of which the surface of connection to the conical surface has, in a diametral plane, a radius of curvature equal to that of the toroidal receptacle. When the two rings are fitted into one another, the receptacles 21, 22 and the beads 23, 24 form semi-annular grooves, the entrance of which is narrowed and in which are seated and retained two elastomeric O-rings 25, 26. These O-rings secure resiliently the two rings to one another for assembly purposes and likewise ensure initial sealing at the break existing between the two conical surfaces. Each of the rings has, in its cylindrical face, a groove 27, 28 which receives a circumferential gasket. The angle which the conical surfaces form relative to the axis of the chamber 13 is of the order of 25 degrees.

The sealing assembly 18 located on the low-pressure side is formed from an outer ring 29 and an inner ring 30. The outer ring 29, which has a triangular cross-section, interacts via one of its sides with the outer surface of the chamber 13 and has a circular groove 31 in which an O-ring is seated. A second side forms the conical surface interacting with the corresponding conical surface of the inner ring. The third side has a circular groove 32 forming one part of a receptacle for an O-ring 33.

The inner ring 30, likewise of triangular cross-section, interacts via two of its perpendicular sides 34, 35, respectively, with the radial end of the sleeve 7 and with the surface of the plunger 3. The third side forms a conical surface which is approximately at an angle of 65 degrees relative to the axis of the chamber and which is connected to a part approximately parallel to the side 35 by means of a toroidal surface forming the other part of the receptacle of the O-ring 33 and defining a bead 36 on the edge of the ring 30. The outer ring 29 and the inner ring 30 are resiliently secured to one another by means of the O-ring 33 which is retained on the groove bottom by the bead 36.

In both sealing assemblies the conical surfaces of the outer and inner rings define an imaginary cone having its apex located on the plunger axis and converging towards the high-pressure side so that the plunger 3 moving towards the high/low-pressure side pulls frictionally the inner rings 20, 30 to facilitate, respectively, tightening and untightening of said assemblies.

In simplified form, a sealing assembly according to the invention can be defined as a cylindrical assembly formed from two wedge rings, the cross-section of the assembly being approximately in the form of a rectangle cut along a diagonal and having, on at least one of its radial faces, a circular groove receiving an elastic O-ring; the groove made in one of the rings being tangent to the conical surface of the other ring.

The mode of operation of the sealing device according to the above-described embodiment is as follows: During the compression stroke, the plunger 3 moving towards the bottom of the pressure chamber 12 compresses the pressure liquid which is introduced between the surface of the plunger and the wall of the pressure chamber up to the bottom of the sealing chamber 13, from which it pushes the sealing assembly 17 back towards the low-pressure side. The sealing liquid which fills the chamber 13 under normal pressure is subjected by the assembly 17 to the high pressure which it transmits to the assembly 18 ensuring the sealing of the low-pressure side. The pressure acting on the outer ring 29 by means of the O-ring tends to cancel the initial play and to lay this ring forcefully against the outer surface of the chamber and, on the other hand, against the inner ring 30 by means of the conical bearing surface. An identical process takes place with regard to the inner ring 30 which bears on the plunger 3 and ensures sealing in this region.

A slight leakage of sealing liquid is acceptable and contributes to lubricating the plunger, thus improving the friction and the useful life of the movable members.

During the suction stroke or pressure-fluid intake cycle, the pressure in the pressure chamber 12 falls and the assembly 17, which is no longer pushed by the pressure liquid, returns to its initial position towards the bottom of the sealing chamber on the high-pressure side, being pushed back by the sealing liquid. The sealing liquid, introduced into the chamber 8 via the duct 9 at relatively low pressure (for example, 100 bars) moves the inner ring 30 away from the surface of the plunger 3 and makes it penetrate into the sealing chamber where it compensates losses attributable to leakages.

In the embodiment illustrated, the sealing device is provided with a stop ring 37 placed against the bottom of the sealing chamber on the high-pressure side to prevent the outer ring 19 of the sealing assembly 17 from being jammed. Since the chamber 13 is subjected to high pressures, for example of the order of more than 3000 bars, machined parts having acute angles are unacceptable since these would be the focus of a concentration of forces liable to cause the component to fracture. To avoid this disadvantage, the bottom of the chamber has a connecting curve which requires either special machining of the edge of the outer ring or the insertion of a stop ring as shown in FIG. 2.

Preferably, the wedge rings are made of metal as, for example, bronze.

The advantages of the sealing device according to the invention are the integration of all the sealing assemblies in the cover so that there is only a single element subjected to pressure stresses;

simplification of the sleeve and the elimination of stresses linked to high pressure;

the possibility of surface hardening treatments of the sealing chamber because of its position in the cover, thus making it possible to increase the hardness of the chamber and consequently obtain better sealing and a longer service life;

simplification of machining;

sealing quality and length of life better than those obtained with the device of the prior art;

the arrangement of the rings allows them to work only under compressive stress and not under bending stress, with compensation of play as a result of their relative movement with one conical surface against the other; and the sealing pressure between the two sealing assemblies is self-regulating to a value which is a function of the pressure in the pressure chamber. This self-adjustment will be the effect of a longer service life.

As will be apparent to one skilled in the art, various modifications can be made within the scope of the aforesaid description. Such modifications being within the ability of one skilled in the art form a part of the present invention and are embraced by the appended claims.

What is claimed is:

1. A high-pressure sealing device for a pressure intensifier comprising a cylinder having a relatively low-pressure end and a relatively high-pressure end, and a coaxially reciprocating plunger arranged for compressing a liquid to high pressure, said cylinder having a stepped portion defining around said plunger an annular recess having an outer wall enclosing first and second axially spaced sealing assemblies located, respectively, on the low- and high-pressure sides of said cylinder and each comprised of at least two concentrically arranged rigid inner and outer wedge rings having confronted conical surfaces, the inner and outer rings having respective inner and outer cylindrical surfaces slidingly confronting the plunger and the outer wall of the annular recess, respectively, whereby axial compression of the wedge rings of each sealing assembly causes relative axial displacement and thus radial expansion thereof and forced mating of all confronting surfaces of said rings, plunger and cylinder, wherein the low-pressure end of one of the wedge rings of said first sealing assembly operatively abuts against the corresponding stepped portion of said cylinder recess while said second sealing assembly is slidably mounted in said recess and the high-pressure end thereof is exposed to the compressed liquid; and wherein an intermediate chamber defined in said recess between said sealing assemblies is filled with a sealing liquid to which the high pressure of said compressed liquid is transmitted through overall axial sliding of said second sealing assembly, thereby causing radial expansion of both sealing assemblies and filling by said sealing liquid of the gaps between said confronted surfaces, said sealing liquid having a viscosity so adapted as to substantially plug said gaps and stop the compressed liquid.

2. The device as claimed in claim 1 wherein the outer wedge ring has, on its cylindrical surface, a groove in which an elastic gasket is seated.

3. The device as claimed in claim 2 wherein the inner wedge ring has, on its inner surface, a groove in which an elastic gasket is seated.

4. The device as claimed in claim 1 wherein at least one of said axially spaced sealing assemblies forms a cylindrical assembly comprising at least said two wedge rings, the cross-section of the at least one of said assemblies being approximately in the form of a rectangle cut along a diagonal with first and second radial faces and having, on at least one of its radial faces, a circular groove in which an elastic O-ring is seated, the said groove made in one of the rings being tangent to the conical surface of the other ring.

5. The device as claimed in claim 4 wherein the end of the conical surface of the wedge ring to which the O-ring is tangent has a bead forming a narrowing at the entrance of the groove in order to restrain the O-ring.

6. The device as claimed in any one of claims 1-5 wherein the sealing assembly located on the high-pressure side transmits the said pressure to the sealing liquid occupying the space contained between the said two assemblies.

7. The device as claimed in claim 6 wherein the wedge rings are made of metal and the device includes O-rings and gaskets which are made of elastomer.

8. The device as claimed in claim 7 wherein the metal wedge rings are bronze.

9. The device as claimed in claim 1 wherein the conical surface of the outer and inner wedge rings defines an imaginary cone having its apex located on the plunger axis and converging towards the high-pressure side.

10. The device as claimed in claim 1 wherein, during the pressure fluid intake cycle, sealing liquid is introduced between the two sealing assemblies to compensate possible losses attributable to leakages, said sealing liquid being introduced via a duct provided upstream of the sealing chamber low-pressure side.

* * * * *

UNITED STATES PATENT AND TRADEMARK OFFICE
CERTIFICATE OF CORRECTION

PATENT NO. : 5,092,609
DATED : March 3, 1992
INVENTOR(S) : Lucien D. Balzano et al It is certified that error appears in the above-indentified patent and that said Letters Patent is hereby corrected as shown below:

On the title page: Item

[73] Assignee: "Berlen" should read -- Bertin --;

Column 2, line 21, "invention is notably" should read -- invention is notable --.

Signed and Sealed this

Sixth Day of June, 1995

Attest:

Attesting Officer

BRUCE LEHMAN
Commissioner of Patents and Trademarks